United States Patent [19]

Joelson

[11] 4,219,181

[45] Aug. 26, 1980

[54] FLUID FLOW GOVERNING VALVE MEANS

[76] Inventor: Karl E. Joelson, Box 67, Lenhovda, Sweden, 36073

[21] Appl. No.: 941,373

[22] Filed: Sep. 12, 1978

[30] Foreign Application Priority Data

Oct. 3, 1977 [SE] Sweden ............................... 7711012

[51] Int. Cl.$^2$ .................... F16K 31/363; F16K 31/40; F15B 13/043

[52] U.S. Cl. ........................................ 251/30; 60/528; 137/625.64; 251/11

[58] Field of Search ..................... 60/528; 137/625.64; 251/11, 30

[56] References Cited

U.S. PATENT DOCUMENTS

| | | | |
|---|---|---|---|
| 1,738,072 | 12/1929 | Kalle | 60/528 |
| 2,030,932 | 2/1936 | Persons | 60/528 |
| 2,787,118 | 4/1957 | Markham | 60/528 |
| 3,613,732 | 10/1971 | Wilson | 251/11 X |
| 3,680,306 | 8/1972 | Nikitin et al. | 60/528 |
| 3,798,894 | 3/1974 | Romanenko et al. | 60/528 |
| 4,018,963 | 4/1978 | Stove | 60/528 |

FOREIGN PATENT DOCUMENTS

| | | | |
|---|---|---|---|
| 2339124 | 2/1975 | Fed. Rep. of Germany . | |
| 490996 | 2/1976 | U.S.S.R. | 251/11 |
| 506720 | 5/1976 | U.S.S.R. | 60/528 |
| 525829 | 10/1976 | U.S.S.R. | 251/11 |
| 555252 | 7/1977 | U.S.S.R. | 251/11 |

*Primary Examiner*—Gerald A. Michalsky
*Attorney, Agent, or Firm*—Cantor & Singer

[57] ABSTRACT

Valve means for governing the flow of fluid to, and possibly also from a consumer, has a housing enclosing a movable main valve member, actuable by pressure fluid operable servo means. A flow control valve in a conduit supplying pressure fluid to the flow control valve is governed by an electric resistance body, e.g. a resistance wire, included in an electric circuit. By controlling the flow of electric current through the circuit the position of the main valve member may be determined within close limits.

When the main fluid to be governed is pressurized the fluid acting upon the servo means may be branched off from the main flow.

4 Claims, 8 Drawing Figures

FLUID FLOW GOVERNING VALVE MEANS

BACKGROUND OF THE INVENTION

The present invention refers to valve means for governing the flow of fluids, and comprises a valve having a housing and a movable valve member, which is adjustable by servo means operated by a pressure fluid. It is common to use a lever, or some similar device, for directly actuating the servo means. It has also been proposed to use a solenoid or an electric motor to monitor the servo means.

The aim of the invention is to provide improved ways of governing the servo means so an exact positioning of the valve member is obtainable in a simple manner. A device according to the invention is easy to handle, is compact and may be manufactured at low costs. It is furthermore not sensible to most external disturbance factors, such as temperature acceleration and outside magnetic fields, and will not, itself, generate magnetic fields which would disturb possible other components in the plant where the device is included.

SUMMARY OF THE INVENTION

A valve according to the invention is characterized in that the servo means is adapted to be governed in response to changes in the volume of an electric resistance body acting upon a flow valve in the pressure fluid circuit of the servo means, and which forms part of an electric ciruict controlling the flow of current through said resistance body.

The electric resistance body preferably is a resistance wire, and is advantageously adapted to actuate a flow governing valve in the fluid supply circuit of the servo means. The resistance wire should have a high capacity for withstanding oxidation, and have a high coefficient of heat expansion. According to a development of the invention a biasing means is provided to act upon the flow valve in the pressure fluid circuit of the servo means, in a direction opposite to that caused by the electric resistance wire.

A device according to the invention may include means for supplying electric current in the form of a series of current pulses of high intensity, for passing through the electric resistance body in order to speed up the governing function. Means may also be provided for adjusting the position of the resistance wire with respect to external factors, especially the ambient temperature.

BRIEF DESCRIPTION OF SOME PREFERRED EMBODIMENTS

Figure 1:
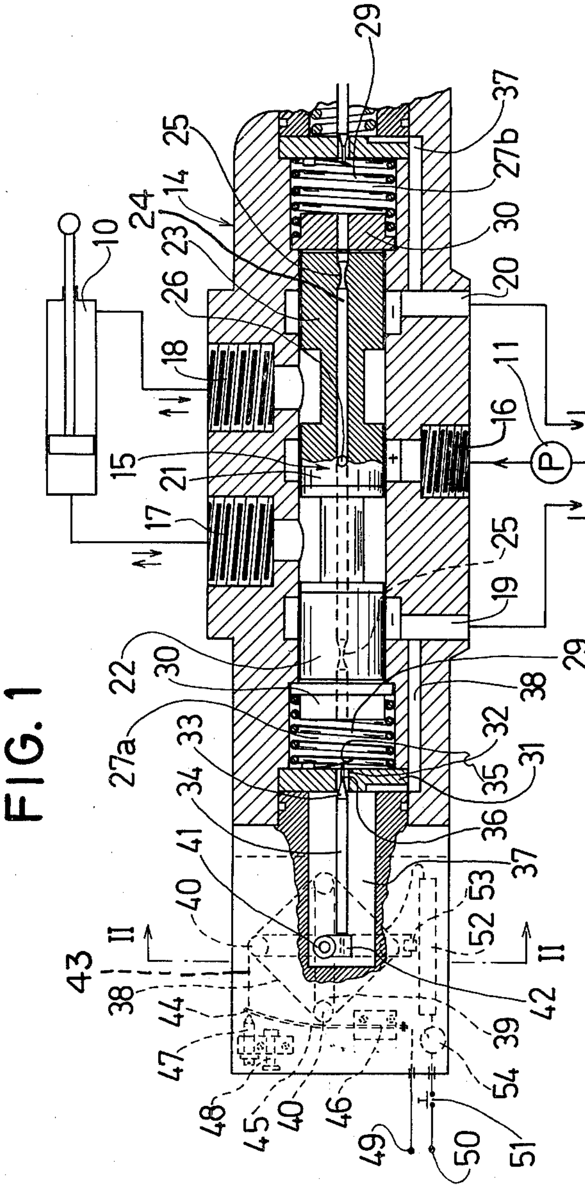
FIG. 1 shows a longitudinal section through part of a first embodiment of the invention.
Figure 2:
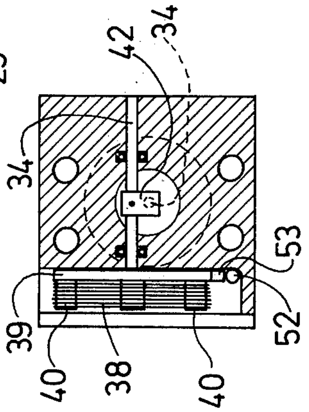
FIG. 2 is a cross section along line II—II in FIG. 1.
Figure 4:
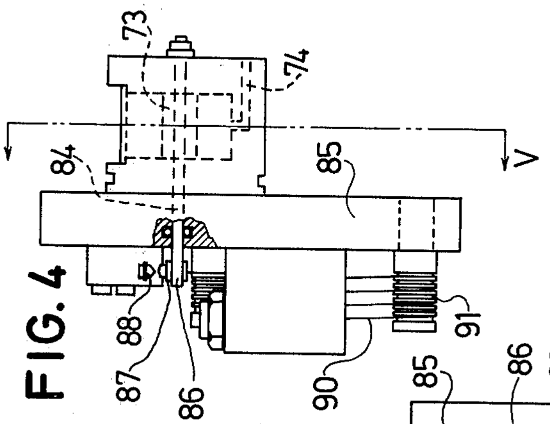
FIG. 4 shows the actuator mechanism removed from the valve housing.
Figure 6:
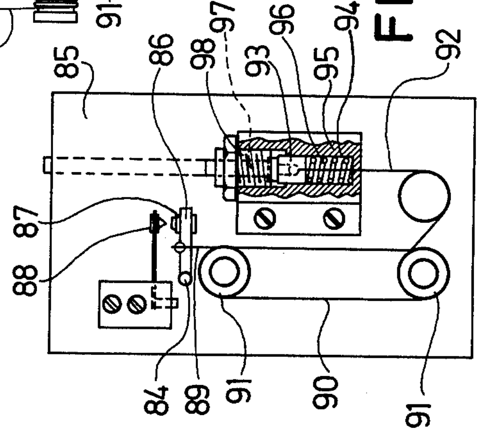
FIG. 6 shows an end view of the mechanism of FIG. 4.
Figure 3:
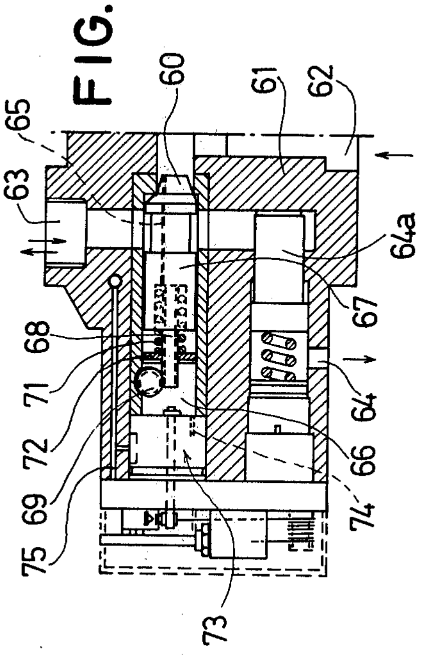
FIG. 3 shows a longitudinal section through part of a second embodiment of the invention.
Figure 5:
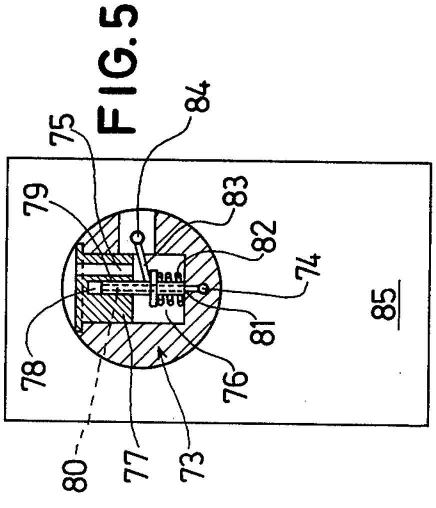
FIG. 5 shows a section along line V—V in FIG. 4.

The device shown in FIGS. 1 and 2 is intended to govern the flow of pressurized fluid to a double acting ram 10 and the return flow of spent fluid therefrom. The system further includes a pump 11 and a tank 12. As such systems are well known in the art the components are shown schematically only.

The flow governing valve means includes a housing 14 enclosing a displaceable valve member 15. There is one inlet 16 connected to pump 12, two connections 17, 18 communicating with ram 10, and two return flow connections 19 and 20.

As the device is intended to govern the flow to and from a double acting ram the housing and the valve member contain portions being substantially mirror image reproductions of each other in respect of a middle plane. FIG. 1, therefore, just shows a little more than one half of the device. This valve member has three lands 21, 22, 23, which cooperate with the inlet 16 for the pressure fluid, as well as with two ports 17 and 18 connectable to consumer 10. A bore 24 provided with throttling portions 25 extends axially through the valve member and communicates with inlet 16 by way of a radial bore 26 for supplying pressure fluid to chambers 27a and b located outside the outward lands 22 and 23. A compression spring 29 is fitted in each of these chambers and will by way of a washer 30 bias the valve member towards the neutral position shown in FIG. 1. There is a central bore in washer 30, and the pressure in chamber 27 will act upon the adjacent end of the valve member. Washer 30 may be pushed into chamber 27 by the valve member, but rests upon a shoulder providing a definite inward position. The end of each spring 29 remote from valve member 15 rests against a plate 31 having a central passage 32, which forms a seat for a valve cone 33 terminating a governing rod 34. A leaf spring 35 is actuable by a pin 36 mounted upon rod 34 and arranged to maintain passage 32 open during normal conditions. Passage 32 communicates chamber 27 with a further chamber 37 located at the opposite side of said plate. A passage 38 extends from chamber 37 to the outlet 19 (and 20, respectively), and may contain a restriction or some other means (not shown) for maintaining a predetermined pressure between chamber 37 and the associated outlet.

Governing rod 34 and chamber 37 form part of a fluid flow governing unit. An essential component in this unit is an electric resistance wire 38, which is coiled in several loops upon a cruciform carrier 39, having support trundels 40 at the ends of its arms, the trundels preferably being rotatable. The carrier is mounted upon a rotatable shaft 41, which preferably extends perpendicularly to the longitudinal axis of valve member 15. A short arm 42 is mounted upon shaft 41, against which the end of governing rod 34, remote from leaf spring 35, is forced by the latter.

One end of resistance wire 38 is attached to carrier 39, and the other end 43 of the wire, issuing from a loop located furthermost from the point of attachment to the carrier, is connected to the distal end 44 of a leaf spring 45, the other end 46 of which is mounted in the valve housing. After a certain elongation of wire 38, leaf spring 45 will contact a stop formed by a set screw 47. Adjustment of set screw 47 will compensate for variations in the ambient temperature. A manually operable pusher knob 48 can be used to flex spring 45 inwards, whereby wire 38 will be slackened and valve cone 33 will contact its seat. Hereby a pressure will build up in chamber 27 and valve member 15 will return to its neutral position.

Figure 7:
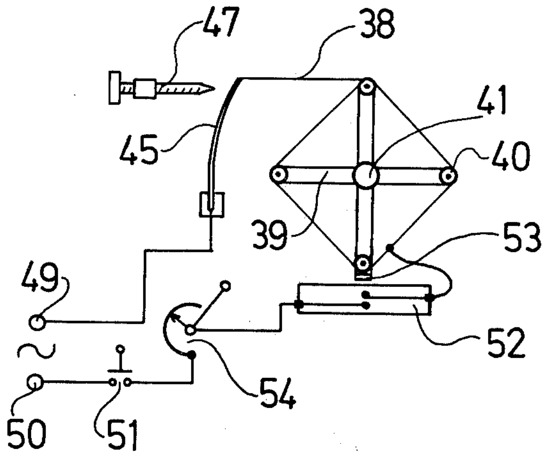
FIG. 7 shows an electric governing circuit including an electric resistance body forming part of the embodiment according to FIGS. 1 and 2.

The electric circuit is shown separately in FIG. 7. One terminal 49 of a suitable AC or DC source is connected to leaf spring 45. The other terminal 50 is by way of a first switch 51 and a further glass tube switch 52 connected to the end of resistance wire 38 remote from leaf spring 45.

Glass tube switch 52 has two tongue contacts of which at least one is attractible by a permanent magnet 53 mounted upon carrier 39, so the contacts are closed when carrier 39 occupies a given position. The circuit further includes a manually actuable, adjustable resistor 54.

By means of this resistor the magnitude of the current supplied to wire 38 will be adjustable to a value corresponding to a pre-selected opening at passage 32 by means of rod 34, whereby the valve member will ensure the use of the device as a directional valve or as a flow metering unit.

The governing device according to FIGS. 1 and 2 operates in the following manner, it being assumed that it is desirable to displace valve member 15 towards the left in FIG. 1. Electric current is supplied to resistance wire 38 by closing switch 51, which brings about an elongation of the wire, so the distal end 44 of leaf spring 45 moves towards, and finally contacts set screw 47. Thereafter further elongation of wire 38 will cause rotation of carrier 39 in the clockwise direction (in FIG. 1), due to the fluid pressure prevailing in chamber 27 and acting upon the end of rod 34. Hereby passage 32 will be opened, whereby the fluid pressure in chamber 27*a* is reduced. This brings about a displacement towards the left (in FIG. 1) of valve member 45, as there is no corresponding outflow of pressure fluid from chamber 27*b* at the opposite end of the valve member.

The use of slide valves of this type is well known in the art. A displacement of valve member 15 towards the left in FIG. 1 will evidently open a connection between inlet 16 and outlet 18, so pressure fluid is supplied to the right side of ram 10. Simultaneously a connection will be opened for return flow from the left side of ram 10 by way of 17 and 25 to tank 12.

Due to the heat inertia of wire 38 a certain period of time must lapse before the elongation of the wire is sufficient to open passage 32 to the desired degree, if the electric current is supplied in an even flow and with an intensity corresponding to a desired opening area. The device will, however, permit a more rapid governing by using a current of considerably higher intensity. When this more intense current passes through wire 38 the same will rapidly expand and the wire support is rotated clockwise. Magnet 53, which in the position shown in FIGS. 1 and 7, holds the tongue contacts of glass-tube switch 52 together, will then be moved so much towards the left (according to the figure) that the tongue contacts are separated, whereupon the current through wire 38 is switched off. This may occur at any desired opening position of rod 34, but is preferably selected so maximum opening of passage 32 is obtained.

When the current is switched off wire 38 will cool down and contract, so carrier 39 is rotated counterclockwise and magnet 53 once again brings the contacts of switch 52 together, whereupon the cycle is repeated. During this time rod 34 is held at the desired (for instance maximum) open position, so valve member 15 is displaced with the desired (maximum) speed in the desired direction.

This intermittent supply permits the use of higher intensity current, than would be acceptable with a constant supply during extended governing cycles.

Switch 52 will also act as a safety device for the resistance wire as the effective length thereof will depend upon its temperature.

Rod 34 and passage 32 will form a servo valve, which, when open, will permit the flow of fluid out of chamber 27 by way of chamber 37 to outlet 19 (or 20). The actual displacement of valve member 15 will depend upon the pump pressure, as the pressure drop across the fixed restrictions 25 in relation to the restriction at 32, 34 will change with variations in the delivery pressure from the pump.

This may be avoided if the effluent from chamber 27 is made to pass a space, where the pressure has a predetermined relationship to the pump pressure, for instance the governing pressure of a load sensing, hydraulic system.

By varying the supply of current, for instance by means of the variable resistor 54, or some other resistance included in the electric circuit, the time required for the governing function may be varied, whereby a smooth movement of the valve member is obtainable.

The invention makes possible a simple manner of determining the positions of the valve member without complications for causing a return movement. An oxidation resistant material, for instance KANTHAL, is preferably used in the resistance wire, which will make the latter unsensitive to influence from the atmosphere and ensures a long service life.

If wire 38 should break, leaf spring 35 will immediately close passage 32, whereupon the slide member automatically returns to its neutral position, which prevents unwanted activity at the fluid consumer supplied by way of the device. The normal movement of rod 34 is so big as to make leaf spring 35 noticeably influence the opening into passage 32.

Instead of starting from a zero current supply at the outset of a governing action and then increase the current, as above described, it is of course possible to operate in the reverse manner, i.e. permitting a current of a certain intensity to normally pass through wire 38 to ensure a length thereof, which will maintain the servo valve 32, 34 closed, and then decreasing the current supply, permitting the wire to cool down to open valve 32, 34.

If the governing range of wire 38 with respect to its temperature is located well above the ambient temperature, for instance at 300° C., the opening position of servo valve 32, 34 will be substantially proportional to the current supplied to the wire. On such occasion the tongue-contact switch 52 may be dispensed with.

The embodiment shown in FIGS. 3–6 will, for the same function as described in connection with FIG. 2, contain two similar valve members 60, axially displaceable in a housing 61 having an inlet 62 for connection to a pump, two attachments 63 for connection to the ram (not shown here) and two return flow outlets 64. A return flow outlet is normally closed by a spring loaded valve 64*a*, which will open automatically when the pressure in the conduit at 63 exceeds a certain value. The valve member 60 has an axial bore 65, which communicates inlet 62 with a chamber 66 at the end of valve member 60 remote from inlet 62. This end of the valve member is formed as a piston 67 and is provided with an axially directed rack 68, which engages a rotatable pinion 69 connected to a variable resistor 70, shown in FIG. 8. A compression spring 71 is fitted between piston 67 and a fixed washer 72.

Valve member 60 may be displaced by varying the fluid pressure in chamber 66, such variation being monitored by a unit 73, fitted into the housing and including a valve. This valve will be described in detail in connection with FIG. 5, and governs the flow from an inlet 74 from chamber 66, to an outlet communicating with a passage 75. This may be connected to the supply tank of the fluid system, or may lead to a container, where a constant difference in pressure is maintained in relation to the pressure at inlet 62.

A bore 76 is formed in the body of unit 73, and is closed by a plug 77. The plug has a blind bore 78, in which a piston 79, having an axial passage 80 is fitted. The outward end 81 of piston 79 will, together with the bottom of bore 76, form a valve governing the flow of fluid through passage 74. A compression spring 82 biases the valve towards open position, while an arm 83 mounted upon a rotatable shaft 84 determines the opening and the closing, respectively, of the valve.

Shaft 84 passes through unit 73 and a mounting plate 85, and is connected to an arm 86, which carries an electric contact 87 cooperating with a basically fixed contact 88. One end 89 of an electric resistance wire 90 is attached to arm 86, and runs over a number of trundles 91. The opposite end 92 of the wire is connected to a plug 93, which is adjustably fitted in a bore 94 in the housing 95 of a unit adapted to automatically compensate the length of wire 90 with respect to variations in the ambient temperature, especially when the device is brought into use. A compression spring 96 is fitted between the bottom of bore 94 and body 93, which biases the latter into engagement with the distal end of a rod 97, the position of which may be adjusted by means of a screw 98. Rod 97 extends outside the housing and may be manually pushed in to occasionally slacken the wire.

Figure 8:
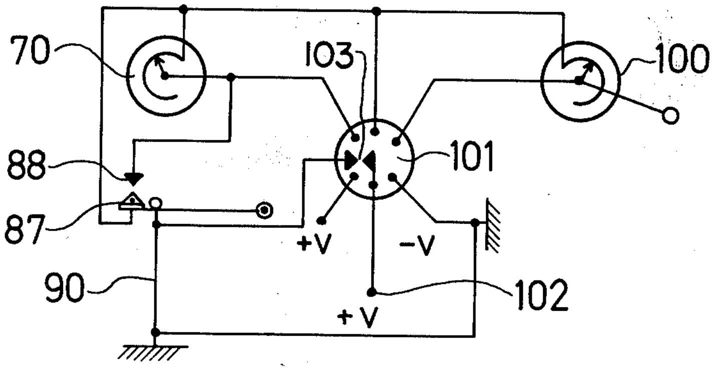
FIG. 8 shows an electric governing circuit for the embodiment according to FIGS. 3–6.

The device according to FIGS. 3–6 is adapted to be governed by means of the circuitry shown in FIG. 8. This includes the variable resistor 70, previously mentioned, which is connected to pinion 69 according to FIG. 3, a further variable resistor 100, which is manually adjustable, and may be fitted in a manoevering panel, or in a portable manoevering device. The circuitry also includes a comparator 101 adapted to close the path through resistance wire 90 from a source of current supply 102 by way of contacts 103 only when the resistance in resistor 100 is less than, or equal to, the resistance in resistor 70.

when it is desired to open valve member 60 the operator actuates resistor 100 so its resistance will be less than that of resistor 70, whereupon current will flow through resistance wire 90, in the manner above described. When starting at low ambient temperature, the initial elongation of wire 90 will be taken up by spring 96 until plug 93 will contact the adjustable rod 97. In this manner compensation for variations in the ambient temperature is obtained.

During the following elongation of the wire, arm 83 and also shaft 84 will be rotated, so piston 79 may move away from the bottom of the bore, due to the action of spring 82. The lower face of the piston will then open the passage for pressure fluid from connection 74, which communicates with chamber 66, to passage 75. The latter is preferably connected to some point where a constant pressure, lower than that at inlet 62 is maintained. The resulting pressure drop in chamber 66 causes piston 67 to move the left, whereby valve 60 is opened. Pinion 69 is rotated and changes the resistance value of resistor 70 until this value corresponds with that of resistor 100.

In order to obtain a rapid governing of the fluid flow the current through the resistance ought to be of high intensity, so a rapid elongation of the wire occurs until valve 79 in unit 73 is fully opened. Contacts 87 and 88 will then be closed, and resistor 70 is short circuited. Comparator 101 will then switch off the current supply to resistance wire 90, so this will cool down. The contacts 87–88 will be opened, the wire will once again be supplied with current, and the cycle will be repeated as required. During this time piston 67 will move in the desired direction. When the resistance in resistor 70 is equal to, or less than that in resistor 100 comparator 101 will break off the flow of current to wire 90, but will start the supply again, as soon as the piston has moved sufficient to make resistance value of resistor 70 bigger than that of resistor 100. The short-circuiting current across resistor 70 is small, about 2 mA only. It is important that opening and closing of the servo valve occurs at a comparatively high temperature, so the cooling down of the wire from open to closed position will occur rapidly.

The embodiments shown and described are to be regarded as examples only, and alternative embodiments falling within the scope of the claims are possible. Instead of a resistance wire any other body may be used, which changes its dimensions when an electric current passes through it, and which is mounted so as to cause, directly or indirectly, a mechanical actuation upon the valve member. Instead of a displaceable valve member a rotatable valve body may be used, in the manner well known in the art.

In both embodiments shown the pressure fluid operating the servo means is branched off from the fluid to be governed, but evidently a separate source of pressure fluid may be used to supply the servo means. In both embodiments shown the branch-off conduit is located in the valve member, but it is also possible to arrange the conduit in the housing for connecting the inlet from the pump to the associated servo means chamber.

What I claim is:

1. An electric circuit for governing the valve member of a fluid flow governing valve means including a housing enclosing a movable main valve member, a conduit for supplying pressure fluid to move said main valve member, valve means in said conduit and having a valve body for controlling the flow of pressure fluid acting upon said main valve member, said circuit comprising:

(A) an electric resistance wire having heat expansion properties and connected to said control valve body, so its thermal movements will determine the position thereof, (B) a source for supplying electric current to said resistance wire, at an intensity higher than acceptable thereof during an extended exposure, (C) potentiometer means for monitoring the supply of current from said source and including a first manually adjustable resistor to indicate the desired input, a second adjustable resistor operable in response to the position of said main valve member and a comparator for evaluating possible differences between the resistance values at said first and second resistors, and (D) means governed by the thermal movements of said wire for causing an intermittent flow of the current allowed to pass on by said potentiometer means.

2. The circuit according to claim 1 further including resilient means for mounting one end of said resistance wire, and ambient temperature compensating means associated with said resilient means for delaying the action of said resistance upon said flow control valve.

3. The circuit according to claim 1 further including means for biasing said flow control valve in a direction opposite that caused by the electric resistance body.

4. The circuit according to claim 1, in which the means for causing an intermittent flow of current to the wire includes a device for short circuiting said second adjustable resistor.

* * * * *